US 6,709,110 B2

(12) United States Patent
Domroese et al.

(10) Patent No.: US 6,709,110 B2
(45) Date of Patent: Mar. 23, 2004

(54) OPTICAL DEVICE FOR PROJECTION SYSTEM

(75) Inventors: Michael K. Domroese, Woodbury, MN (US); Russell A. Roiko, Rogers, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/171,348

(22) Filed: Jun. 12, 2002

(65) Prior Publication Data
US 2003/0058537 A1 Mar. 27, 2003

Related U.S. Application Data
(60) Provisional application No. 60/298,007, filed on Jun. 13, 2001, and provisional application No. 60/385,050, filed on May 30, 2002.

(51) Int. Cl.[7] .............................. G03B 21/00; G02B 7/18
(52) U.S. Cl. ....................... 353/33; 353/122; 359/831
(58) Field of Search ................................ 349/7, 8, 9, 10, 349/58, 60; 353/30, 31, 32, 33, 119, 34, 122; 359/495, 496, 500, 831, 503

(56) References Cited

U.S. PATENT DOCUMENTS

| | | | |
|---|---|---|---|
| 6,095,653 A | * | 8/2000 | Yajima ........................ 353/33 |
| 6,320,709 B1 | | 11/2001 | Kitabayashi et al. |
| 6,345,895 B1 | * | 2/2002 | Maki et al. ................... 353/33 |
| 6,565,213 B1 | * | 5/2003 | Yamaguchi et al. .......... 353/33 |

FOREIGN PATENT DOCUMENTS

| | | |
|---|---|---|
| EP | 1 073 280 A2 | 1/2001 |
| JP | 7-226941 | 8/1995 |
| JP | 10-142467 | 5/1998 |
| JP | 10-239783 | 9/1998 |
| JP | 10-319853 | 12/1998 |
| JP | 2000-147362 | 5/2000 |
| JP | 2000-221587 | 8/2000 |
| JP | 2000-259094 | 9/2000 |
| JP | 2000-310823 | 11/2000 |
| JP | 2001-154271 | 6/2001 |
| JP | 2001-154273 | 6/2001 |
| JP | 2001-195006 | 7/2001 |
| WO | WO00/70386 | 11/2000 |

OTHER PUBLICATIONS

U.S. patent application Ser. No. 09/878,575, filed Jun. 11, 2001, Polarizing Beam Splitter.
U.S. patent application Ser. No. 09/878,559, Jun. 11, 2001, Projection System Having Low Astigmatism.
U.S. patent application Ser. No. 10/159,694, May 29, 2002, Projection System Having Low Astigmatism.

* cited by examiner

Primary Examiner—Russell Adams
Assistant Examiner—Andrew Sever
(74) Attorney, Agent, or Firm—Bruce E. Black

(57) ABSTRACT

The present invention pertains to an optical device useful in a projection system. The optical device can be designed for easy replacement of selected parts, if necessary, without the need for extensive realignment procedures for the projection system.

32 Claims, 8 Drawing Sheets

OPTICAL DEVICE FOR PROJECTION SYSTEM

CROSS REFERENCE TO RELATED APPLICATIONS

This application claims the benefit of U.S. Provisional Application Ser. No. 60/298,007 filed Jun. 13, 2001 and U.S. Provisional Application Ser. No. 60/385,050, filed May 30,2002, which are incorporated herein by reference.

TECHNICAL FIELD

The present invention provides an optical device that is useful in a projection system. In particular, the device provides for proper alignment of the components constituting the optical core and provides for a system that allows for access and removal of some of the components.

BACKGROUND

A projection system typically requires proper alignment of the components, particularly the optical components, used therein. It is also desirable to be able to change certain parts of the projector components that may need replacement due to normal usage. For example, it is a common practice to replace a burnt light bulb in a projection system with a new one. It is desirable that such replacement procedures are user friendly so that the majority of users can follow them.

There is a need for similar versatility and ease in replacing other parts in a projection system.

SUMMARY

The present invention provides for an optical device designed so as to allow for precise placement of the components making up the optical core. The optical core comprises of a polarizing beam splitter and a imaging unit, which further comprises at least one color prism, at least one imager, and optionally, at least one heat dissipating unit.

Advantageously, the design of optical device and the various optical core components allow for easy removal of a polarizing beam splitter (PBS). The design desirably yields a system whereby the PBS can be removed and replaced by a typical user such that additional alignment of the optical components is usually not necessary. Thus, the design is robust and is user friendly.

In brief summary, the present invention provides an optical device in a projection system, the device comprising: (a) a polarizing beam splitter (130) further comprising: (i) first, second, third, and fourth sides, and top and bottom surfaces, wherein the first and third sides, the second and fourth sides, and the top and bottom surfaces are substantially parallel to one another, and wherein the first, third, and fourth sides define a first aperture (134), a second aperture (132), and a third aperture (131) respectively; (ii) a first means for spacing the polarizing beam splitter and a projection lens unit (120), the first means for spacing (136a) disposed on the first side of the polarizing beam splitter; (iii) a second means for spacing (136b) the polarizing beam splitter and an optical core frame, the second means disposed on the fourth side of the polarizing beam splitter; (iv) a third means for spacing (136c) the polarizing splitter and the optical core frame, the third means disposed on the top surface of the polarizing beam splitter; and (v) a first axis located at the geometric center of the polarizing beam splitter; (b) a carrier assembly (700) for guiding the insertion and removal of the polarizing beam splitter, the carrier attached to at least a portion of the bottom surface of the polarizing beam splitter and located proximate to the second side of the polarizing beam splitter, the carrier further comprising: (i) means for grasping the carrier (703); and (ii) at least one guide member (707); and (c) an imaging unit (140) having a second geometric center axis, the imaging unit located proximate to the third side of the polarizing beam splitter and in optical communication with the polarizing beam splitter.

In this document, the term "about" is presumed to modify all numerical recitation of a physical property such as, but not limited to, dimensions (length, width, height) and thickness of a material. For example, a film having a thickness of 1 mm is presumed to be a film having a thickness of "about" 1 mm.

BRIEF DESCRIPTION OF THE DRAWINGS

The invention may be more completely understood in consideration of the following detailed description of the various embodiments of the invention in connection with the accompanying drawings, in which:

FIG. 5a and 5b are front views of carrier assembly 700 disengaged from optical core frame 600 in accordance with the present invention while

These figures are idealized, are not to scale, and are intended to be illustrative and non-limiting.

DETAILED DESCRIPTION OF THE INVENTION

Figure 1:
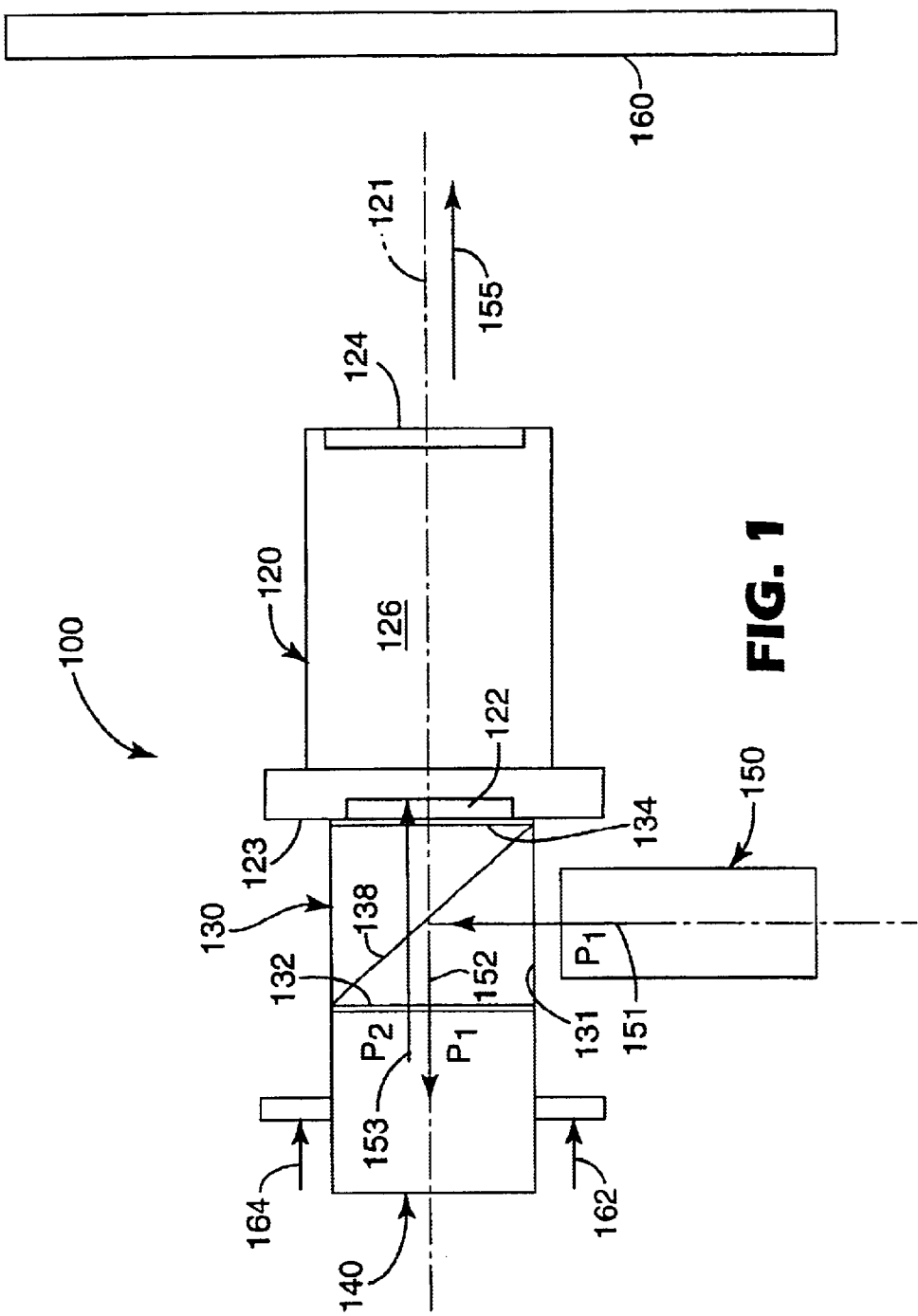
FIG. 1 is a schematic diagram illustrating projection unit 100 in accordance with one aspect of the invention.

Referring to FIG. 1., in one aspect, the present invention is a projection display apparatus 100 comprising projection lens unit 120, PBS 130, imaging unit 140, and illumination unit 150. In very simplified form, in use, polarized light having polarization state $P_1$ enters PBS unit 130 in the direction indicated by arrow 151. Birefringent multi-layer film 138, which functions as a reflective polarizer, reflects light having polarization $P_1$ in direction 152 into imaging unit 140. The imaging unit may further contain electronic imaging devices, not shown, that can rotate the polarization of illumination 152 in a pixel-wise manner, to form at least one image.

In a preferred embodiment, imaging unit 140 comprises three imaging devices, each one illuminated by a different color, wherein imaging unit 140 divides incoming light 151 into three colors, each directed at one of the three imaging devices. The color images formed in this manner are then recombined by imaging unit 140 to form imaging beam 153, which is then incident on birefringent multi-layer film 138. Because some of the light in beam 153 comes from pixels that have rotated the polarization of incident illumination 152, this light is transmitted by birefringent multi-layer film 138, while light having unrotated polarization is reflected back toward illumination unit 150. As a result, the image produced by imaging unit 140 is transmitted to projection lens unit 120, which projects image light rays 155 onto screen 160.

The PBS 130 has first, second, third, and fourth sides and top and bottom surfaces. The first and third sides, second and fourth sides, and top and bottom surfaces are substantially parallel to each other. The first side corresponds to a first aperture 134, the third side corresponds to the second aperture 132, and the fourth side corresponds to the third aperture 131. As shown, incident polarized light 151 enters the fourth side of the PBS. The second side of the PBS is a non-aperture surface and lies proximate to a carrier assembly, as further described below.

The quality of the image projected by lens unit 120 onto screen 160 is improved if lens unit 120, PBS 130, and imaging unit 140 are properly positioned and aligned relative to one another. Moreover, it is preferred that positioning and alignment be robust, so that PBS 130 can be replaced without significant detrimental effects on projected image quality. It has been found that good image quality can be achieved if PBS 130 and imaging unit 140 can be located within ±0.1 millimeters, in all directions, of their design positions, and orientation of PBS 130 and imaging unit 140 can be maintained within ±0.1 degree about three coordinate axes similar to the x-, y-, and z-coordinate axes. In this document, the three coordinate axes include: (1) the optical axis, i.e., the geometric center of the PBS 130, imagining unit 140 or projection lens unit 120 represented as line 121, and (2) a first axis perpendicular to 121 running vertically and lies in the plane of the page (not shown), and (3) a second axis perpendicular to 121 and comes out of the plane of the page (not shown).

In one aspect of the invention, proper positioning and alignment of lens unit 120, PBS 130, and imaging unit 140 can be achieved through the use of compression springs, as further explained below. The forces exerted from such springs are schematically shown in FIG. 1 as arrows 162 and 164, which push the imaging unit 140 against the PBS 130 which in turn pushes against projection lens unit 120. Proper alignment of lens unit 120, PBS 130, and imaging unit 140 means that the optical axes of the components are substantially coaxially aligned.

Projection lens unit 120 comprises input aperture 122, output aperture 124, and a system of projection lenses, located internal to enclosure 126, preferably aligned along optical axis 121, but not shown.

Polarizing Beam Splitter

A PBS is an optical component that splits incident light rays into a first (transmitted) polarization component and a second (reflected) polarization component.

For projection systems that use reflective liquid crystal display (LCD) imagers, a folded light path where the illuminating light beam and the projected image share the same physical space between a polarizing beam splitter (PBS) and an imager offers a compact design. Most reflective LCD imagers are polarization rotating, i.e., polarized light is either transmitted with its polarization state substantially unmodified for the darkest state or transmitted with its polarization state rotated to provide a desired gray scale. Thus, a polarized light beam is generally used as the input beam. Use of a PBS offers an attractive design because it can function to polarize the input beam and fold the light path.

WO 00/70386, in FIG. 1, discloses a Cartesian PBS element 50 that includes a multi-layer birefringent film 52 encased in a glass cube 54, and oriented so as to reflect light incident with x-polarization (i.e., approximately s-polarization). See page 11, lines 9 to 11. For incident rays of light in a large cone angle, the Cartesian PBS has been demonstrated to provide a higher contrast than a PBS that discriminates only on the basis of s-polarization vs. p-polarization. The Cartesian PBS is one useful PBS that can be used in the present invention.

Yet another useful PBS is disclosed in U.S. patent application Ser. No. 09/878,575 entitled "Polarizing Beam Splitter," filed on Jun. 11, 2001, by the assignee of this invention, which application is hereby incorporated by reference in its entirety. This application disclosed a PBS comprising: (a) a birefringent film having a pass axis, the birefringent film comprising multi-layers of at least a first material layer and a second material layer, each material layers having an absorption edge in the visible spectrum such that in the ultraviolet region, the absorption edge is at least 40 nm less than the shortest wavelength of light that illuminates the polarizing beam splitter and in the infrared region, the absorption edge is at least 40 nm greater than the longest wavelength of light that illuminates the polarizing beam splitter; and (b) at least one prism having a refractive index greater than 1.6 but less than a value that would create total internal reflection along the pass axis of the birefringent film. The PBS is said to have extended durability in the near UV and blue light of the visible spectrum. The term "pass axis" means the optical axis of transmission of the polarizer, i.e., of the birefringent multi-layer film.

In a projection system, such as a front or rear projection system, typically two substantially right angle triangular prisms will be used to form substantially a cube-shaped PBS. In this case, the birefringent film is sandwiched between the hypotenuses of the two prisms using an attachment means, as discussed below. A cube-shaped PBS is preferred in most projection systems because it provides for a compact design, i.e., the light source and other components, such as filters, can be positioned so as to provide a small, light-weight, portable projector. For some systems, the cube-shaped PBS may be modified such that one or more faces are not square. If non-square faces are used, a matching, parallel face should be provided by the next adjacent component, such as the color prism or the projection lens.

Although a cube is one preferred embodiment, other PBS shapes can be used. For example, a combination of several prisms can be assembled to provide a rectangular PBS. Although the PBS disclosed in WO 00/70386 and U.S. patent application Ser. No. 09/878,575 are exemplary examples of useful PBS, other types of PBS can be used in the present invention.

The prism dimension and thus the resulting PBS dimension depend upon the intended application. In an illustrative front projector, the PBS is a cube of 40 mm in length and width, with a 57 mm hypotenuse when using a small arc high pressure Hg type lamp, such as the UHP type sold commercially by Philips Corp., with its beam prepared as an F/2.2 cone of light and presented to the PBS cube for use with 0.78 inch diagonal imagers, such as the SXGA resolution imagers available from Three-Five Systems. The f/# of the beam, optical distance (i.e., sum of actual distances divided by the index of refraction for each unit of distance) separating the imager(s) from the PBS, and the imager size are some factors that determine the PBS size.

Figure 2:
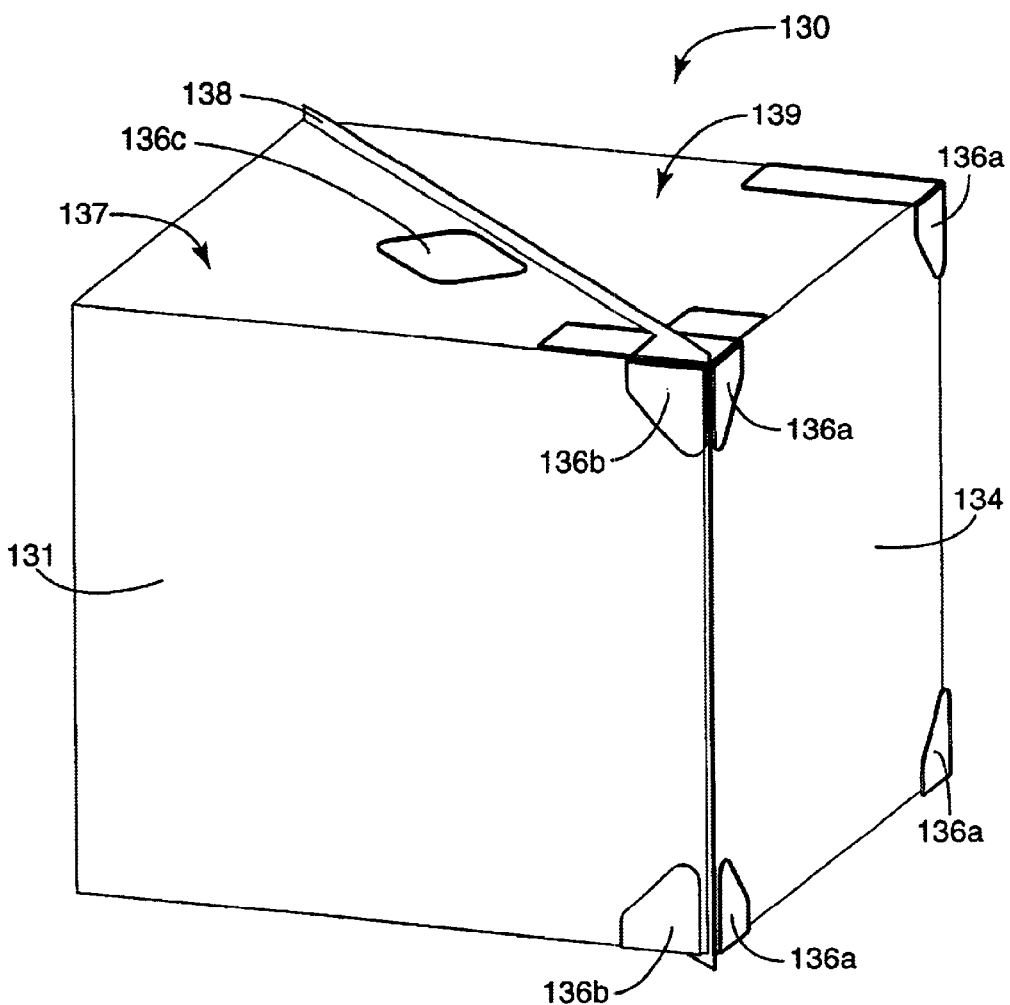
FIG. 2 is a front view of a polarizing beam splitter 130 in accordance with one embodiment of the invention.

FIG. 2 shows a front view of a substantially cubic-shaped PBS 130 formed from first prism 137 and second prism 139 and having birefringent multi-layer film 138 embedded along the hypotenuse of the prisms. Typically, film 138 extends beyond the hypotenuse of prisms 137 and 139. The prisms are substantially right angle prisms. The PBS has a first aperture surface 134 corresponding to the first side where a first means for spacing 136a are located. Tabs 136a function to create a desired spacing between the PBS and the projection lens unit. On the third aperture surface 131, second means for spacing 136b are located. Tabs 136b function to create a desired spacing between the PBS and an optical core frame. On the top surface of PBS 130, a third means for spacing 136c is located. Tab 136c also function to create a desired spacing between the PBS and the optical core frame. Although tabs 136a, 136b, and 136c are shown as discrete tabs that overlap to the top surface of the PBS, they may take on any configuration so long as the tabs do not interfere with the light path. Furthermore tabs 136a, 136b, and 136c function to stabilize the PBS in the carrier frame, i.e., to minimize rotation and movement of the PBS.

In one preferred embodiment, it has been found that a low friction material can function as the first, second, and third means for spacing. A suitable low friction material is polytetrafluoroethylene (PTFE) film or tape is particularly useful. A commercially available PTFE film is TEFLON tape. In another embodiment, tabs 136a is a polyethylene terephthalate film having a thickness of 0.127 mm (0.005 inches) affixed to the PBS by a pressure sensitive adhesive tape.

Imaging Unit

Figure 3:
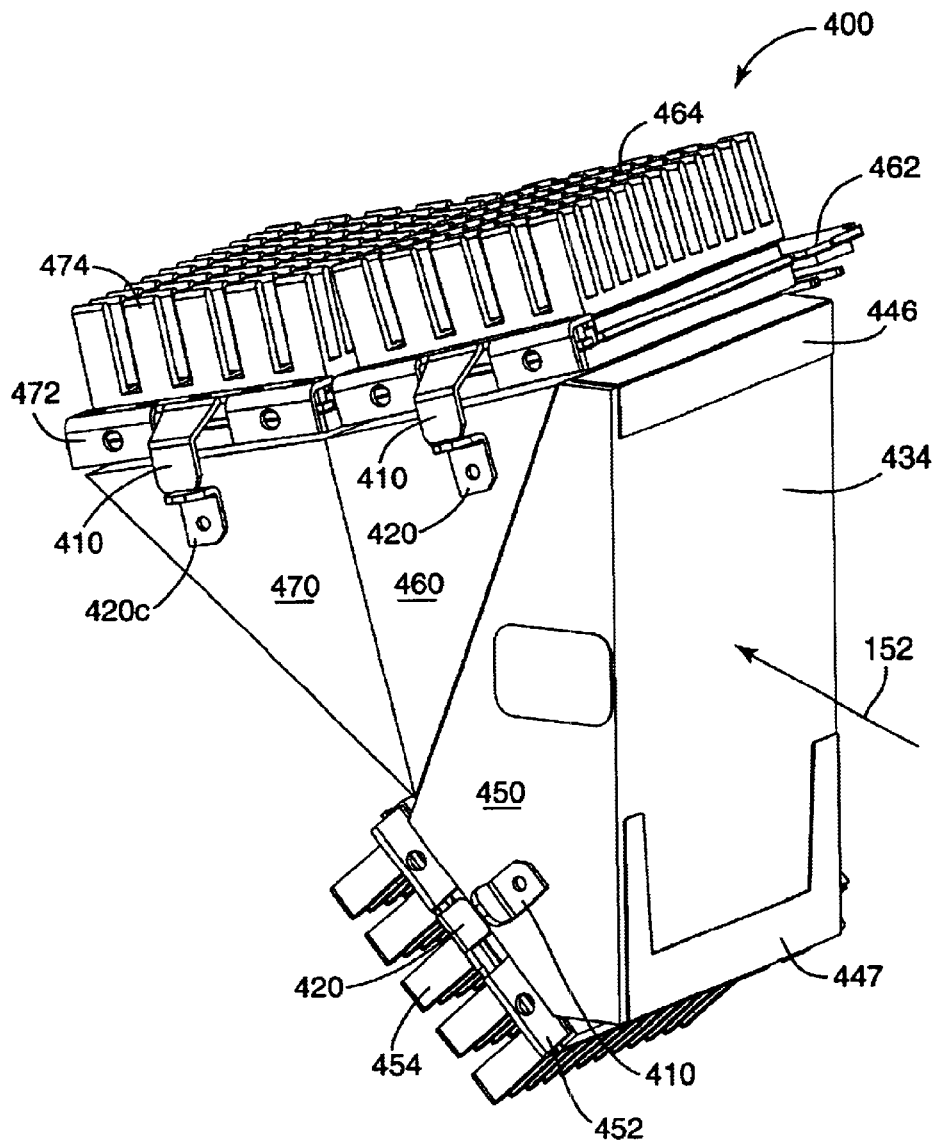
FIG. 3 is a front view of an imaging unit 400 in accordance with one embodiment of the invention.

After the incident polarized light 152 leaves the PBS, it enters the imaging unit. FIG. 3 shows imaging unit 400 having a first color prism 450 and an associated first imager 452, a second color prism 460 and an associated second imager 462, and a third color prism 470 and an associated third imager 472. Optionally, heat dissipating units 454, 464, and 474 can be used to cool the imagers, and are located proximate to the imagers. Polarized beam 152 is directed towards a color splitter/combiner prisms 450, 460, and 470 that splits the polarized beam 152 into three sub-beams. The three sub-beams are reflected and modulated off red, green, and blue reflective imagers 452, 462, and 472. A controller, not shown, can be coupled to the imagers to control their operation. Typically, the controller activates different pixels of the imagers to create an image in the reflected light. The reflected and modulated sub-beams are recombined by the color splitter/combiner prisms (hereinafter referred to as "color prism" for convenience). The modulated components of the combined beams 153 pass through PBS 130 and are projected as an image by projection lens unit 120.

Imagers 452, 462, and 472 are affixed to the color prisms by attachment means 410 and 420. Although FIG. 3 shows attachment means 410 and 420 as brackets, other attachment means can be used. For example, the imagers and the color prisms can be adhesively attached. For attaching the imagers to the color prisms, first, positioning and alignment of the imagers is done by holding each imager in an alignment fixture. The fixture also hold the combined prisms 450, 460, and 470. Position adjustment can be done while the imagers display a color test image. When the colors are in proper registration, bracket 410 is soldered to bracket 420. The brackets are preferably metallic when a soldering process is used. Bracket 420 can be attached to the color prisms 450, 460, and 470 using any suitable adhesive that is capable of withstanding soldering temperatures. On aperture surface 434, a fourth means of spacing 446 and 447 can be used space between the joined color prism and the PBS (not shown).

Figure 4:
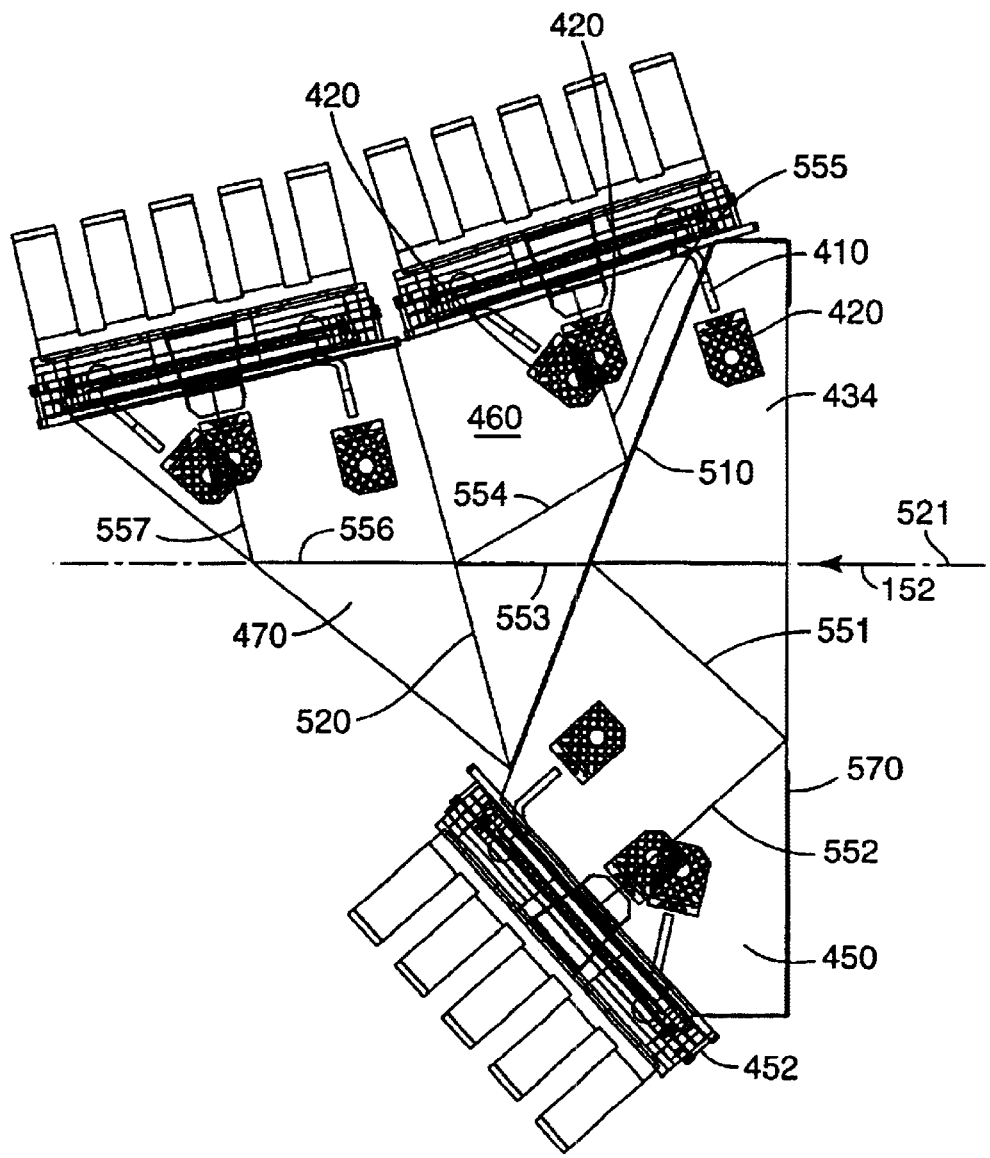
FIG. 4 is a cross sectional view of imaging unit 400 showing a simplified tracing of ray 152.
Figure 5A:
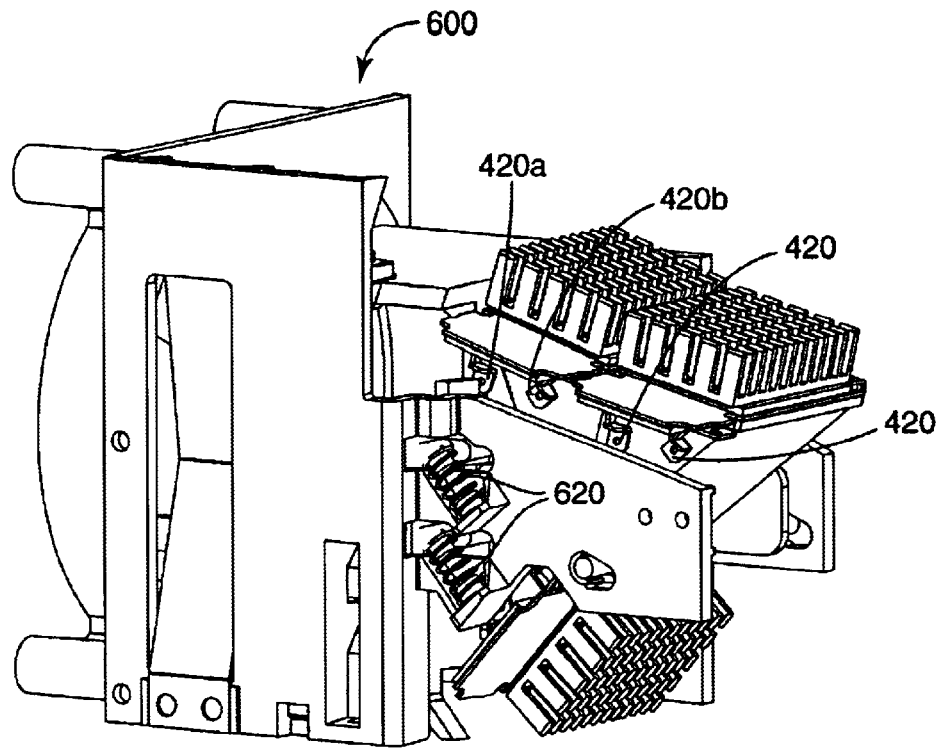

FIGS. 3, 4, and 5a illustrate one embodiment of the brackets 410, 420 with three independent brackets 420 coupled to each prism 450, 460, 470. By independent, it is meant that a bracket are not integrally formed with another independent bracket, but the independent brackets are separate structures. One of the independent brackets 420a is coupled on one side of each prism (see FIG. 3) and two independent brackets 420b, 420c are coupled to the opposing side of each prism (see FIG. 5a).

FIG. 4 shows a simplified tracing of polarized light ray 152. As ray 152 enters illumination aperture 434, it is transmitted to color prism interface 510, where light of a first color is reflected as ray 551, to reflective surface 570, and to imager 452, where it is reflected, in a pixel wise manner, with the image being formed by rotation or nonrotation of the polarization plane of incident light 552. Light reflected from imager 452 retraces paths 552, 551, and 152, to emerge from aperture 434. Light not reflected by the color filter at interface 510 is transmitted along 553 to prism interface 520, where a second color is reflected along rays 554 and 555 to imager 462, where it undergoes pixel wise polarization rotation and is reflected back along rays 555, 554, 553, and 152. The remaining light not reflected by prism interface 520 is transmitted along 556 and 557 to imager 472, where it is reflected in with polarization rotated in a pixel wise manner, back to aperture 434.

Carrier Assembly

The carrier assembly allows for quick and easy removal of the PBS from the optical core frame. In one preferred embodiment, the carrier assembly is a thermoplastic molded part.

Figure 5B:
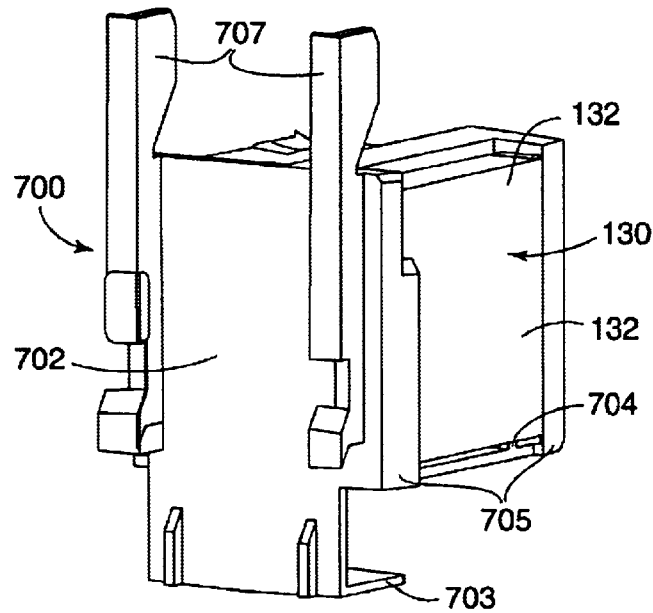

FIG. 5b shows a carrier assembly 700 having a base 702, a means for grasping the assembly 703 and guide members 707, first cam surfaces 705, and support member 704. As shown, PBS 130 has been inserted into the carrier assembly such that the third side of the PBS with aperture 132 is exposed. Proximate and parallel to base 702 is the second side, i.e., the non-aperture surface, of the PBS (not shown). PBS 130 is affixed to the carrier assembly at support member 704. Typically, multiple support members are used. Preferably, PBS 130 is adhesively bonded, e.g., with epoxy, to support member 704.

Figure 6:
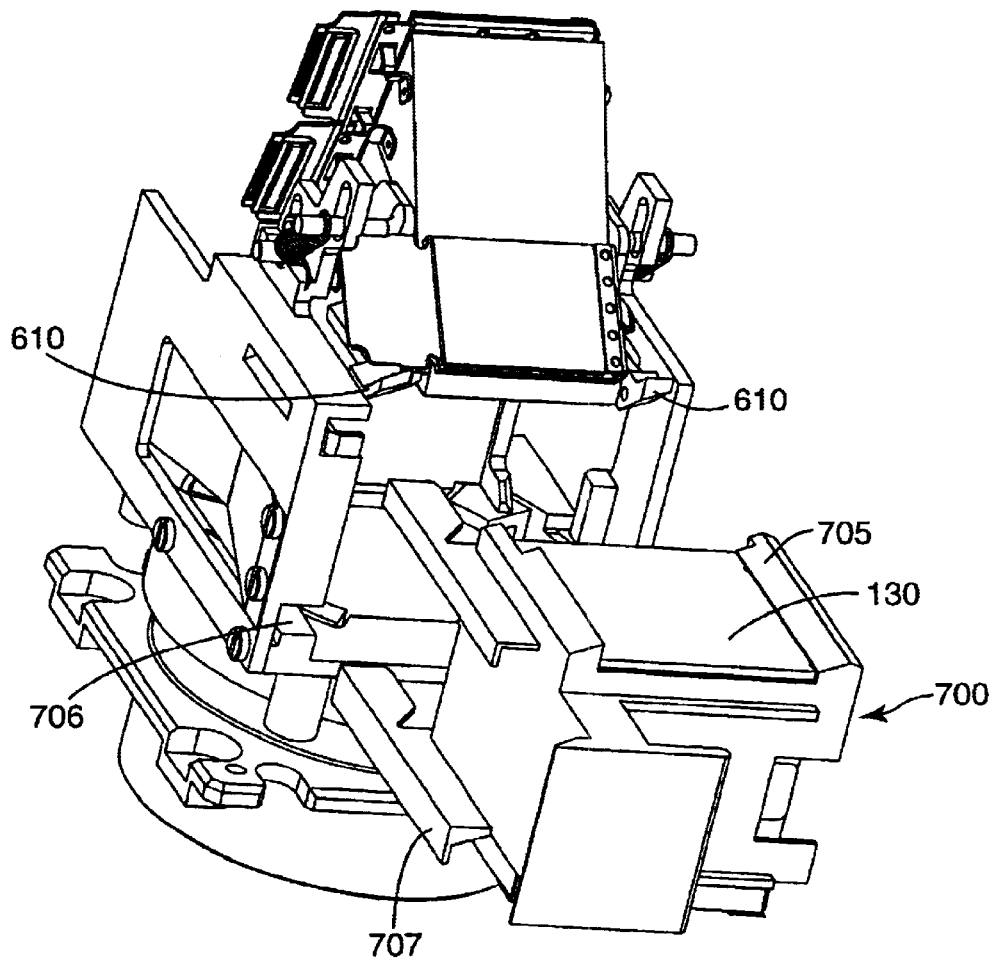
FIG. 6 is a front view of carrier assembly 700 partially engaged in optical core frame 600.

In use, as carrier assembly 700 slides into optical core frame 600 (shown in FIG. 5a), first cam surfaces 705 push against second cam surfaces on brackets that are bonded to either side of color prism 450. This sliding action pushes the color prisms away from the PBS so that aperture 132 of PBS 130 does not come into contact with the color prism. When the PBS 130 has slid close to its proper vertical height, slot features on the carrier assembly 700 and slot features on the optical core frame allow the PBS to move forward (towards the projection unit 120) and to the side of the optical core frame to the PBS final resting position. FIG. 6 schematically shows the cam surfaces 610 of the optical core frame 600 as the carrier assembly 700 slides into the frame, through the use of guide members 707 contacting guide rails 706.

Figure 5C:
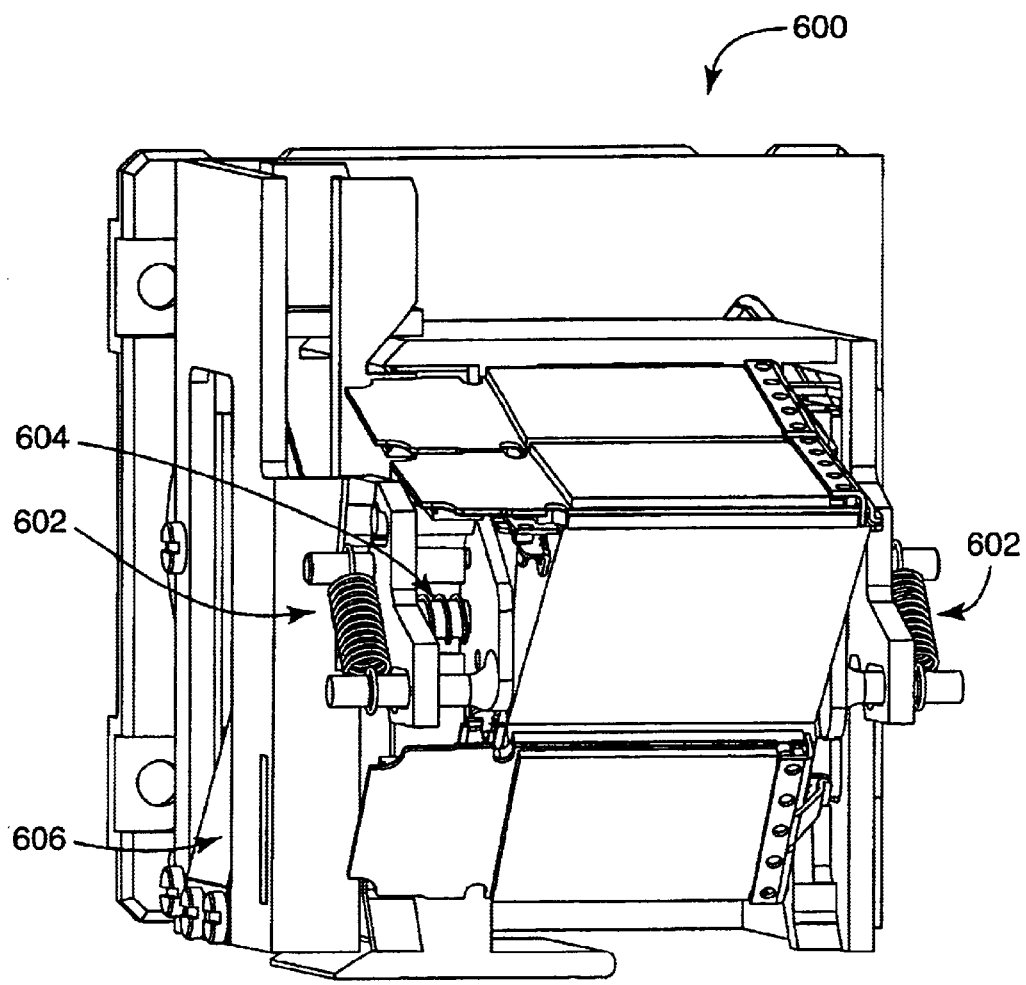
FIG. 5c shows the carrier assembly 700 engaged in the frame 600.

As shown in FIG. 5c, optical core frame 600 contains optional extension springs 602, compression springs 604, and optional leaf springs 606, all functioning to position and align the imaging unit 400, the PBS and its carrier assembly against the projection lens unit.

Illumination Source

A typical light source includes a lamp and a reflector. Suitable lamps include xenon, incandescent, laser, light emitting diode (LED), metal halide arc light source, and high-pressure mercury light source. Such light sources can emit light in the blue and near ultraviolet wavelength.

Another Embodiment

Figure 7:
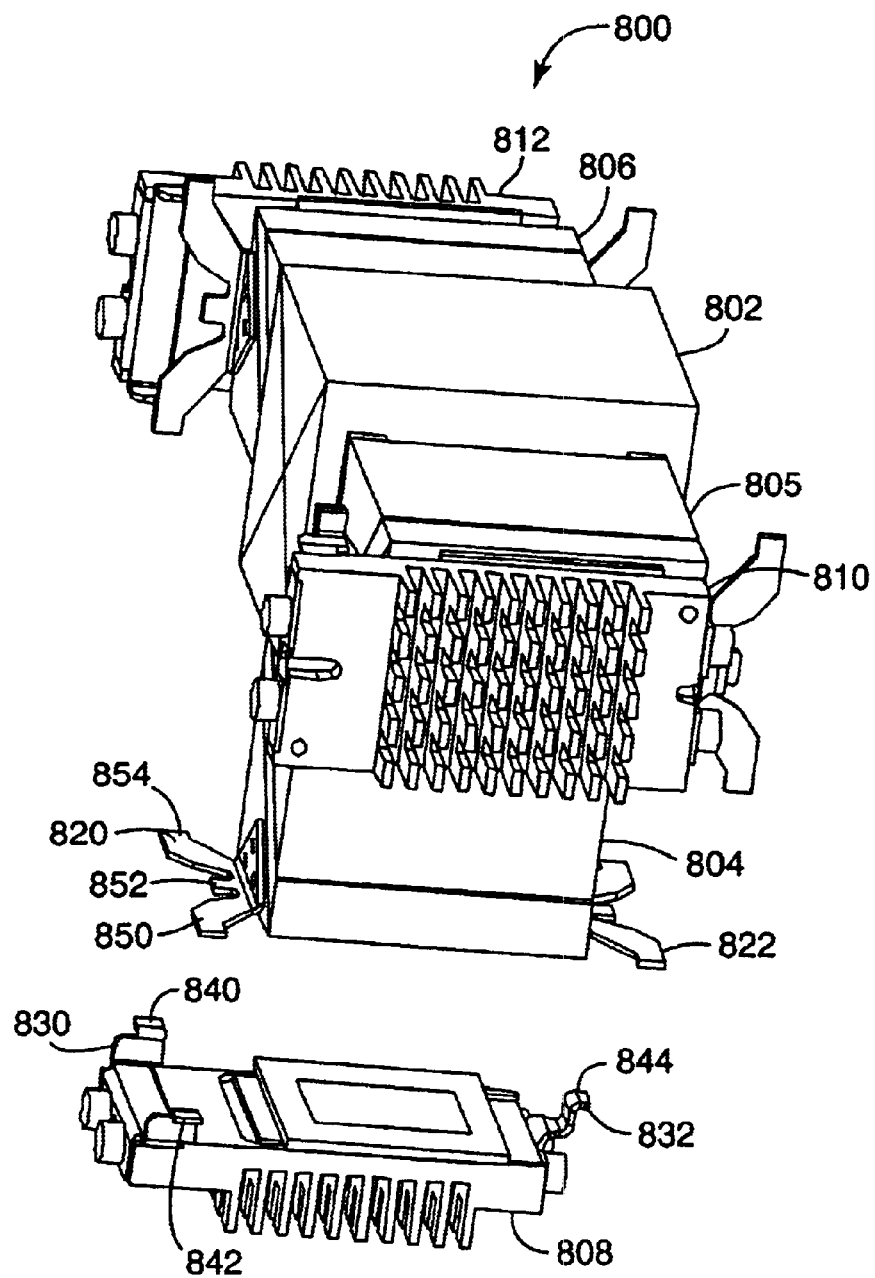
FIG. 7 is a perspective view of an imaging unit in accordance with another embodiment of the invention.

FIG. 7 illustrates another embodiment of an imaging unit 800. The imaging unit 800 includes an x-cube structure 802 for directing and combining light, three PBS structures 804, 805, and 806, and three imagers 808, 810, 812. Examples of such imaging units and the component structures can be found in, for example, U.S. Patent Application Ser. No. 09/878,559 and U.S. Patent Application Ser. No. 10/159,694, entitled "PROJECTION SYSTEM HAVING LOW ASTIGMATISM", filed May 29, 2002, both of which are incorporated herein by reference.

Each imager 808, 810, and 812 is mounted to the corresponding PBS structure 804, 805, 806, respectively, using two mounting brackets 820, 822 disposed on the PBS structure and two imager brackets 830, 832 mounted on the imager. The two mounting brackets 820, 822 are independent of each other. The two imager brackets 830, 832 provide three or more (preferably three) mounting sites 840, 842, 844 for coupling to the mounting brackets 820, 822.

In the preferred embodiment, one imager bracket 830 has two mounting sites 840, 842 that are spaced apart from each other along a width dimension, w, (where the width dimension is defined as the smaller of the width and length dimensions of the imager) of the imager 808. These two mounting sites 840, 842 can then be coupled to a single mounting bracket 820. The second imager bracket 832 is spaced apart from the first imager bracket along the length dimension, 1, of the imager 808. The second imager bracket 832 has a single mounting site 844 that can be coupled to the mounting bracket 822. This arrangement can provide stability of the positioning of the imager while reducing the effects along the longest dimension of the different thermal expansion coefficients of the mounting brackets 820, 822 and the PBS structure 804.

The mounting brackets 820, 822 are adhesively or otherwise coupled to the PBS structure. The mounting brackets 820, 822 are preferably, but not necessarily, similarly shaped, as illustrated in FIG. 7 with structures 850, 852, 854 to couple to any of the mounting sites 840, 842, 844, even though only one or two of those structures will be used. This preferred arrangement can reduce the complexity of the assembly of the imaging unit 800.

The imager brackets 830, 832 can be mounted to the imager, for example, to a heat sink portion of the imager, using any mounting technique, including, for example, adhesive or mechanical (using screws, bolts, etc.) or welding or soldering techniques. The imager brackets 830, 832 can be coupled to the mounting brackets 820, 822 using any mounting technique including adhesive mounting. In one embodiment, the imager brackets 830, 832 and mounting brackets 820, 822 are soldered together to facilitate easy of mounting or readjustment to align the imager or both.

In one embodiment, the imager bracket 832 is configured and arranged, as illustrated in FIG. 7, to permit flexing along the length dimension of the imager. This can be achieved, for example, by using a relatively thin piece of material that is appropriately shaped so that the imager bracket 832 can flex along the length dimension of the imager. This flexing can be useful to accommodate the differential thermal expansion between the imager and the polarizing beam splitter or other optical element. The other imager bracket 830 can be configured and arranged to resist flexing along the length dimension of the imager.

What is claimed is:

1. An optical device, comprising:
   an optical element;
   at least two independent brackets mounted on the optical element; and
   a first imager arrangement that is configured and arranged to receive light from the optical element, the first imager arrangement comprising at least two imager brackets coupled to the independent brackets of the optical element to hold the first imager arrangement in a desired positional alignment relative to the optical element.

2. The optical device of claim 1, wherein the optical element comprises a first polarizing beam splitter.

3. The optical device of claim 2, further comprising
   a second polarizing beam splitter;
   at least two independent brackets mounted on the second polarizing beam splitter; and
   a second imager arrangement comprising at least two imager brackets coupled to the independent brackets of the second polarizing beam splitter to hold the second imager arrangement in a desired positional alignment relative to the second polarizing beam splitter.

4. The optical device of claim 3, further comprising
   a third polarizing beam splitter;
   at least two independent brackets mounted on the third polarizing beam splitter; and
   a third imager arrangement comprising at least two imager brackets coupled to the independent brackets of the third polarizing beam splitter to hold the third imager arrangement in a desired positional alignment relative to the third polarizing beam splitter.

5. The optical device of claim 4, wherein the first, second, and third polarizing beam splitters are independently coupled to different sides of an x-cube component.

6. The optical device of claim 2, wherein the optical device comprises at least three independent brackets mounted on the first polarizing beam splitter.

7. The optical device of claim 2, wherein the at least two imager brackets are coupled to the independent brackets by solder.

8. The optical device of claim 2, wherein the at least two independent brackets comprise a first bracket and a second bracket, wherein the first bracket and second bracket are disposed on opposing sides of the polarizing beam splitter.

9. The optical device of claim 2, wherein the at least two independent prism brackets further comprise a third bracket, wherein the second bracket and third bracket are disposed on a same side of the polarizing beam splitter.

10. The optical device of claim 2, wherein the at least two independent brackets are adhesively mounted on the polarizing beam splitter.

11. The optical device of claim 2, wherein the at least two independent brackets consist essentially of two independent brackets.

12. The optical device of claim 11, wherein the two independent brackets are substantially identical.

13. The optical device of claim 11, wherein the two independent brackets each have three mounting sites for coupling to the imager brackets.

14. An optical device, comprising:
    a first color prism;
    at least two independent brackets mounted on the first color prism; and
    a first imager arrangement comprising at least two imager brackets coupled to the independent brackets of the first color prism to hold the first imager arrangement in a desired positional alignment relative to the first color prism.

15. The optical device of claim 14, further comprising
    a second color prism;
    at least two independent brackets mounted on the second color prism; and a second imager arrangement comprising at least two imager brackets coupled to the independent brackets of the second color prism to hold the second imager arrangement in a desired positional alignment relative to the second color prism.

16. The optical device of claim 15, further comprising a third color prism;

at least two independent brackets mounted on the third color prism; and a third imager arrangement comprising at least two imager brackets coupled to the independent brackets of the third color prism to hold the third imager arrangement in a desired positional alignment relative to the third color prism.

17. The optical device of claim 14, wherein the optical device comprises at least three independent brackets.

18. The optical device of claim 14, wherein the at least two imager brackets are coupled to the independent brackets by solder.

19. The optical device of claim 14, wherein the at least two independent brackets comprise a first bracket and a second bracket, wherein the first bracket and second bracket are disposed on opposing sides of the color prism.

20. The optical device of claim 19, wherein the at least two independent prism brackets further comprise a third bracket, wherein the second bracket and third bracket are disposed on a same side of the color prism.

21. The optical device of claim 14, wherein the at least two independent brackets are adhesively mounted on the color prism.

22. A display device, comprising:

an optical element;

at least two independent brackets mounted on the optical element;

a imager arrangement that is configured and arranged to receive light from the optical element, the imager arrangement comprising at least two imager brackets coupled to the independent brackets of the optical element to hold the imager arrangement in a desired positional alignment relative to the optical element; and a screen configured and arranged to receive and display light from the imager arrangement.

23. The display device of claim 22, wherein the optical element comprises a color prism.

24. The display device of claim 22, wherein the optical element comprises a polarizing beam splitter.

25. A method of making an optical device, the method comprising:

mounting at least two independent brackets on an optical element;

mounting at least two imager brackets on an imager arrangement; and coupling the imager brackets to independent brackets to hold the imager arrangement in a desire positional alignment relative to the optical element.

26. The method of claim 25, wherein the optical element comprises a color prism.

27. The method of claim 25, wherein the optical element comprises a polarizing beam splitter.

28. The method of claim 25, wherein the step of mounting at least two independent brackets comprises mounting three independent brackets.

29. The method of claim 25, wherein the step of mounting at least two independent brackets comprises mounting a first bracket and a second bracket on opposing sides of the optical element.

30. The method of claim 29, wherein the step of mounting at least two independent brackets further comprises mounting a third bracket on a same side of the optical element as the second bracket.

31. The method of claim 25, wherein the step of mounting at least two independent brackets comprises mounting the at least two independent brackets on the optical element using an adhesive.

32. The method of claim 25, wherein the step of coupling the imager brackets to the independent brackets comprises soldering the imager brackets to the independent brackets.

* * * * *

UNITED STATES PATENT AND TRADEMARK OFFICE
CERTIFICATE OF CORRECTION

PATENT NO. : 6,709,110 B2
DATED : March 23, 2004
INVENTOR(S) : Domroese, Michael K.

It is certified that error appears in the above-identified patent and that said Letters Patent is hereby corrected as shown below:

Column 7,
Line 24, delete "1" and insert in place thereof -- I --.

Column 10,
Line 15, delete "desire" and insert in place thereof -- desired --.

Signed and Sealed this

Thirtieth Day of November, 2004

JON W. DUDAS
*Director of the United States Patent and Trademark Office*